US009836365B2

(12) United States Patent
Ray

(10) Patent No.: US 9,836,365 B2
(45) Date of Patent: Dec. 5, 2017

(54) RECOVERY EXECUTION SYSTEM USING PROGRAMMATIC GENERATION OF ACTIONABLE WORKFLOWS

(71) Applicant: Sungard Availability Services, LP, Wayne, PA (US)

(72) Inventor: Kaushik Ray, Herndon, VA (US)

(73) Assignee: SUNGARD AVAILABILITY SERVICES, LP, Wayne, PA (US)

( * ) Notice: Subject to any disclaimer, the term of this patent is extended or adjusted under 35 U.S.C. 154(b) by 67 days.

(21) Appl. No.: 14/682,262

(22) Filed: Apr. 9, 2015

(65) Prior Publication Data

US 2016/0299819 A1    Oct. 13, 2016

(51) Int. Cl.
*G06F 11/00* (2006.01)
*G06F 11/20* (2006.01)

(52) U.S. Cl.
CPC ........ *G06F 11/2025* (2013.01); *G06F 11/203* (2013.01); *G06F 11/2041* (2013.01)

(58) Field of Classification Search
CPC . G06F 11/2025; G06F 11/203; G06F 11/2041
See application file for complete search history.

(56) References Cited

U.S. PATENT DOCUMENTS

| 8,402,064 | B2 | 3/2013 | Addala et al. |
| 8,438,418 | B2 | 5/2013 | Ashraff et al. |
| 8,600,941 | B1 * | 12/2013 | Raj ............... H04L 67/1095 707/640 |
| 8,763,006 | B2 | 6/2014 | Bobak et al. |
| 2005/0049906 | A1 | 3/2005 | Leymann et al. |
| 2006/0236151 | A1 | 10/2006 | Costlow et al. |
| 2006/0294507 | A1 | 12/2006 | Buskens et al. |
| 2007/0165525 | A1 | 7/2007 | Kageyama |
| 2009/0172536 | A1 | 7/2009 | Cheng et al. |
| 2009/0307166 | A1 | 12/2009 | Routray et al. |
| 2010/0153962 | A1 | 6/2010 | Tatu |
| 2011/0173405 | A1 | 7/2011 | Grabarnik |
| 2011/0307735 | A1 | 12/2011 | Greenberg |
| 2013/0111260 | A1 | 5/2013 | Reddy et al. |
| 2013/0339956 | A1 | 12/2013 | Murase et al. |
| 2013/0346617 | A1 | 12/2013 | Hotes et al. |
| 2014/0082131 | A1 | 3/2014 | Jagtap |
| 2014/0365822 | A1 | 12/2014 | Tarves, Jr. |

(Continued)

FOREIGN PATENT DOCUMENTS

EP    2645253    10/2013

OTHER PUBLICATIONS

"Guide to Authorizing Operations Orchestration Flows," HP Operations Orchestration Software Studio, Software Version 7.50, Hewlett-Packard Development Company, L.P., 2008, Document Release Date: Mar. 2009, 187 pages.

(Continued)

*Primary Examiner* — Bryce Bonzo
*Assistant Examiner* — Jonathan Gibson
(74) *Attorney, Agent, or Firm* — VLP Law Group, LLP

(57) ABSTRACT

Programmatic generation of an actionable recovery workflow from data stored inside a Configuration Management Database which may be primarily populated through automated discovery. The programmatic workflow can be sent to an orchestration engine for execution, leveraging underlying automation components.

27 Claims, 9 Drawing Sheets

(56) References Cited

U.S. PATENT DOCUMENTS

2015/0007171 A1 1/2015 Blake et al.
2016/0132372 A1* 5/2016 Anderson ........... G06F 11/0709
714/15

OTHER PUBLICATIONS

HP Operations Orchestration Data Sheet, Hewlett-Packard Development Company, L.P., Rev. 9, May 2014, 8 pages.
International Search Report and Written Opinion mailed Jun. 8, 2016 for International Application No. PCT/US2016/019687 filed on Feb. 26, 2016 by Sungard Availability Services, LP, 15 pages.

* cited by examiner

```xml
701  <xml>
     <ServerInfo state="1111:">
        <id>3f46a04c-96f7-11e4-9a3a-002264f38886</id>
        <hostname>wgisprd02</hostname>
        <platform>PowerEdge M600</platform>
        <OS>Linux</OS>
        <RAM>32185</RAM>
        <CPU/>
        <Provision>
           <Action id="3f46ae16-96f7-11e4-9a3a-002264f38886">
              <type>ra_deploy_server</type>
              <name>linux</name>
              <param name="EVENT_ID">5015</param>
              <param name="SERVER_ASSET">Lo7 302-B</param>
              <param name="RAID_LEVEL">5</param>
              <param name="HOSTNAME">wgisprd02</param>                      718
              <param name="BACKUP_AGENT">netbackup-update-7.5.0.5-0.x86_64</param>
              <param name="OS_NAME">RHEL5</param>
702           <param name="OS_SP">10</param>
              <param name="OS_ARCH">x64</param>
           </Action>
           <Action id="de6b45c7-613a-4261-9884-5a29bc316457">
              <type>hpsa_agent_install</type>
              <name>linux</name>                                            720
              <param name="mac_address">D4-85-64-77-0F-2A</param>
           </Action>
        </Provision>
        <Configuration>
           <Action id="3f46c874-96f7-11e4-9a3a-002264f38886">
              <type>hpsa_script</type>                                      722
              <name>DisableFirewall-Linux</name>
           </Action>
                                                                            729
704        <Action id="3f46cb3a-96f7-11e4-9a3a-002264f38886">
              <type>manual_step</type>
              <name>Wait For Migration To Customer Network</name>
              <param name="displayinfo">Waiting For System wgisprd02 To Get Migrated to Customer
     Network</param>
           </Action>
        </Configuration>
        <Restoration>
           <Action id="res11251-3919-4ce7-b116-b4ba2c766b30">
              <type>hpsa_swp</type>                                         730
              <name>SWP_Netbackup-7.5-0</name>
           </Action>
           <Action id="3f46e142-96f7-11e4-9a3a-002264f38886">
              <type>hpsa_script</type>
706           <name>nbu_restore_linux</name>
              <param name="startdate">12/27/2014</param>                    732
              <param name="enddate">1/1/2015</param>
              <param name="dirpath">/cis</param>
              <param name="mastersrvrname">wbkupprd41.main.pssworldmedical.com</param>
           </Action>
        </Restoration>
708     <Cleanup/>
     </ServerInfo>
710     ...
```

FIG. 7A

```xml
<ServerInfo state="1111:">
  <id>3f4950bc-96f7-11e4-9a3a-002264f38886</id>
  <hostname>wodbprd04</hostname>
  <platform>9117-MMB</platform>
  <OS>AIX</os>
  <RAM>65536</RAM>
  <CPU/>
  <Provision>
    <Action id="3f495e5e-96f7-11e4-9a3a-002264f388886">
      <type>sos_aix_prov</type>
      <name>wodbprd04</name>
      <param name="COPPER_ID">DBJP561-P2-C5-T1</param>
      <param name="CLIENT_IP">60.2.1.8</param>
      <param name="SERVER_IP">60.1.1.2</param>
      <param name="GATEWAY">60.1.1.2</param>
      <param name="MANAGED_SYSTEM">P7-770-3_SN101EF7R</param>
      <param name="SYSCFG_NAME">wodbprd04</param>
      <param name="HMC_IP">10.64.43.36</param>
      <param name="HMC_USER">hmcuser</param>
      <param name="HMC_PASS">rs6k@401</param>
    </Action>
  </Provision>
  <Configuration>
    <Action id="3f498578-96f7-11e4-9a3a-002264f38886">
      <type>hpsa_script</type>
      <name>mkvg_aix</name>
      <param name="disksize">3353088</param>
      <param name="ppsize">1024</param>
      <param name="vgname">pss_all</param>
    </Action>
    <Action id="3f4990ae-96f7-11e4-9a3a-002264f38886">
      <type>hpsa_script</type>
      <name>mklv_aix</name>
      <param name="fstype">jfs2</param>
      <param name="lvname">redolv02</param>
      <param name="nopps">115</param>
      <param name="vgname">pss_all</param>
    </Action>
  </Configuration>
  <Restoration>
      ...
      ...
  </Restoration>
  <Cleanup/>
</ServerInfo>
```

FIG. 7B

```xml
<ServerInfo state="1111:">
  <id>3f4ff03e-96f7-11e4-9a3a-002264f38886</id>
  <hostname>wfldedi01</hostname>
  <platform>PowerEdge M610</platform>
  <OS>Windows 2003</OS>
  <RAM>4096</RAM>
  <CPU/>
  <Provision>
    <Action id="3f4ffdea-96f7-11e4-9a3a-002264f388886">
      <type>ra_deploy_server</type>
      <name>windows</name>
      <param name="EVENT_ID">5015</param>
      <param name="SERVER_ASSET">Lo7 C01-K</param>
      <param name="RAID_LEVEL">5</param>
      <param name="HOSTNAME">wfldedi01</param>
      <param name="SYSTEM_DISK_SIZE">22593</param>
      <param name="BACKUP_AGENT">symantec_netbackup_7.5.0.5.x86</param>
      <param name="OS_NAME">W2K3</param>
      <param name="OS_SP">1</param>
      <param name="OS_EDITION">S</param>
      <param name="OS_KEY">XXXXX-XXXXX-XXXXX-XXXXX-XXXXX</param>
      <param name="OS_ARCH">x86</param>
    </Action>
    <Action id="3f501af0-96f7-11e4-9a3a-002264f38886">         ⎫
      <type>hpsa_agent_install</type>                          ⎪
      <name>windows</name>                                     ⎬ 740
      <param name="mac_address">D4-85-64-76-F5-44</param>      ⎪
    </Action>                                                  ⎭
  </Provision>
  <Configuration>
    <Action id="24b4561b-986d-4c6b-ae5e-82f33dacf684">         ⎫
      <type>hpsa_script</type>                                 ⎬ 742
      <name>DisableFirewall-Win</name>                         ⎪
    </Action>                                                  ⎭
    <Action id="3f5031ca-96f7-11e4-9a3a-002264f38886">         ⎫
      <type>hpsa_script</type>                                 ⎪
      <name>ConfigureDisk-Win</name>                           ⎪
      <param name="DriveLetter">D</param>                      ⎬ 744
      <param name="PartitionNumber">2</param>                  ⎪
      <param name="PartitionSize">33798</param>                ⎪
    </Action>                                                  ⎭
  </Configuration>
  <Restoration>
      ...
  </Restoration>
  <Cleanup/>
</ServerInfo>
....
</rml>
```

FIG. 7C

RECOVERY EXECUTION SYSTEM USING PROGRAMMATIC GENERATION OF ACTIONABLE WORKFLOWS

BACKGROUND

Background Information

Information technology (IT) service providers are quite often challenged to find ways to effectively manage and maintain very large-scale infrastructures. An example enterprise environment may have many thousands of devices and hundreds of installed software applications to support. The typical enterprise also uses many different types of central data processors, networking devices, operating systems, storage services, data backup solutions, cloud services, and other resources.

There is certainly a push to migrate to automated solutions for management of such a diverse environment. In some implementations point-to-point integration can be accomplished with Run Book Automation (RBA) solutions. But even coordination of automated solutions can become quite complex as that often involves integration of multiple products and services including provisioning engines, functional level products, and security concerns.

Disaster Recovery (DR) operations are for the most part a primarily manual operation. For highly virtualized environments and cloud-based applications, there are some available tools that leverage automation. But a large portion of enterprise IT is still not virtualized or placed in the cloud. For such environments, the only option is to manually codify recovery processes for each and every application and each and every data center scenario. That is typically a very labor intensive and time-consuming process.

Some implementations do leverage "task level" automation tools, freeing human operators to focus on coding the overall "orchestration". One such tool is Hewlett-Packard's (HP's) Operations Orchestration (HPOO), which permits automation of enterprise-scale IT processes and solutions. But even a solution based on HPOO still requires a human programmer to write a set of procedures that determine the appropriate tasks and the correct sequence in which to execute them.

SUMMARY

What is needed is a way to programmatically automate the creation of an actionable workflow to support automated task execution, such as might be used in Disaster Recovery (DR). The approach should automatically generate a master workflow containing subflows with automated decisions to further activate available automation components. The master workflow may be generated from data available in a Configuration Management DataBase (CMDB) and stored as a markup language (XML) format file. The CMDB can be initially populated through automated discovery of a production data center's Configurable Items (CI's). The automated discovery of CI's may have a scope, such as the particular application(s) for which recovery is desired. The CMDB data and resulting workflow file can then be sent to an orchestration engine to execute an actionable workflow, leveraging the underlying automation components. This approach also expedites the substitution of different automation components as they become available.

One distinction with the approach from a high-level perspective is that the orchestration of a series of recovery tasks may now be completely automated.

The master workflow can be specified as a set of instructions to an orchestration engine. In one example implementation, the master workflow is dynamically and programmatically created by extracting information from the CMBD and storing it as a specified Recovery Markup Language (RML) file. The RML file may contain specialized tags and may be formatted on, for example, an extensible markup language (XML) file. The CMDB contains information about the configuration of each Configurable Item (CI) in the IT infrastructure. The CMDB also maintains an Application Map that defines not only the in-scope servers, storage devices, and network devices in the production environment but also the relationship of each given application to each of these in-scope Configurable Items.

A Recovery Execution System (RES) then leverages these elements. The RES includes several components including an RML generator, one or more RML models, an orchestration engine, automation components, and access to a list of assets available in the recovery site. The RML generator may for example be a Java program that reads the CMDB to obtain information about the configurable items related to the application scope. The RML model generator then automatically creates the XML-based schema with specialized tags and attributes to specify the high-level master flow. The orchestration engine then reads the RML file to execute the master flow, which in turn instantiates subflows to execute corresponding automation components.

The RML file specifies the workflow as a sequence of tasks or "phases" needed at a high-level rather than being involved with exactly specifying how to implement each task. As one example, the RML file may specify "build an Operating System" as one phase in the master workflow rather than specifying an exact sequence of steps for how to actually build the particular OS. As a result, the master workflow is not tightly coupled to any one particular recovery technology, and the RML master flow can remain the same as different recovery technologies become available. This approach also does not require the recovery solution to virtualize the physical elements of the data center, or to change recovery strategies as different technologies become available.

BRIEF DESCRIPTION OF THE DRAWINGS

The description below refers to the accompanying drawings, of which:

FIGS. 7A, 7B, and 7C include excerpts from an example Recovery Markup Language (RML) file.

DETAILED DESCRIPTION OF AN ILLUSTRATIVE EMBODIMENT

Figure 1:
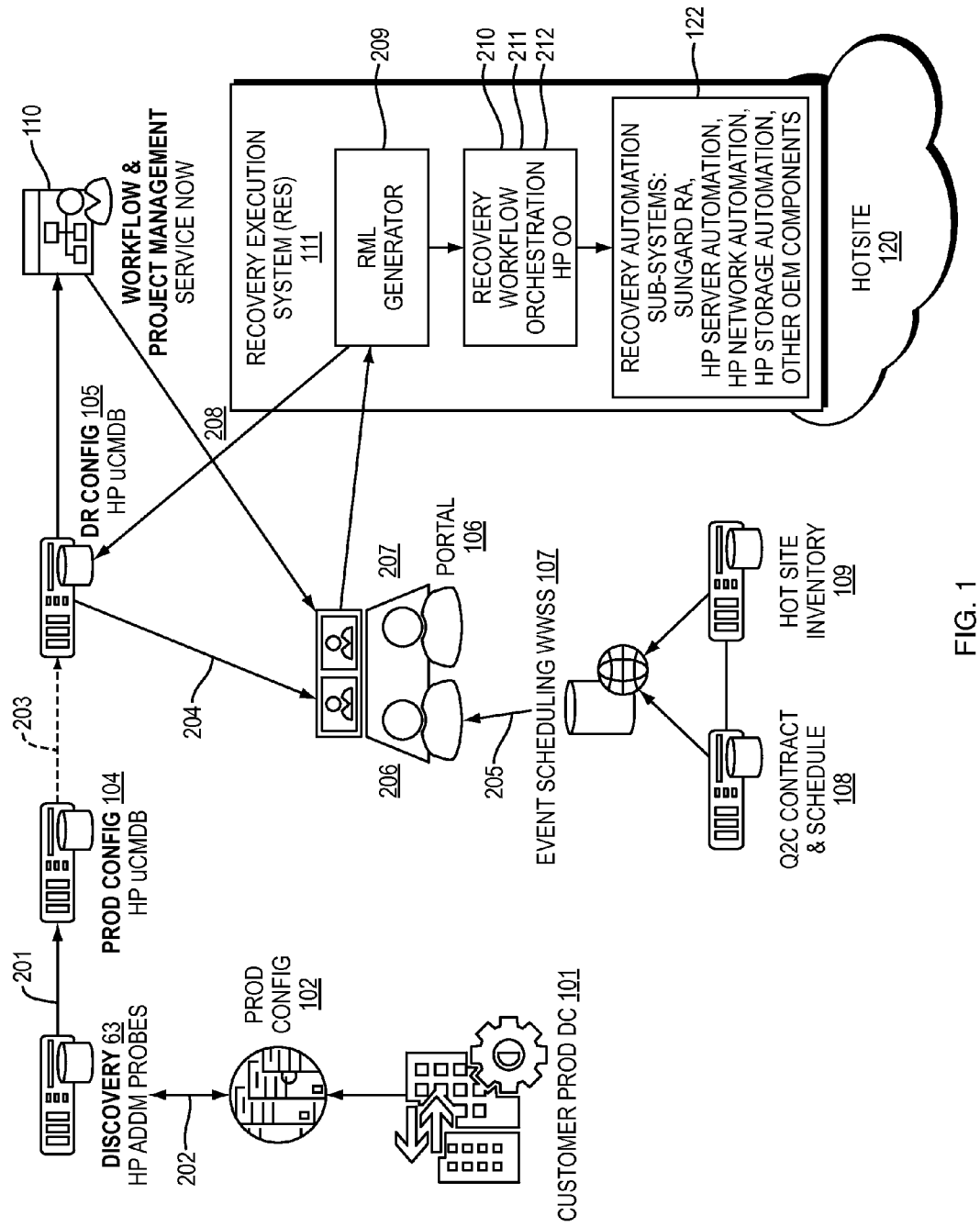
FIG. 1 is a high-level diagram illustrating how a Recovery Execution System (RES) may programmatically generate a master workflow for recovery of a data center at a recovery site.

FIG. 1 is a high-level diagram of an environment where a Recovery Execution System (RES) may be used to programmatically create and maintain a recovery procedure. In this end use of the RES, the goal is to recover one or more Configurable Items (CI's) existing in a production data center 101, recovering them to a hot site 120. The implementation may be used as a managed recovery program for Configurable Items (CI's) that include data processors, servers, storage subsystems, firewalls, security appliances, networking devices, and many other types of information technology (IT) infrastructure elements.

The illustrated elements include the production data center 101, production configuration information 102, a discovery tool 103, a production environment Configuration Management DataBase (CMDB) 104, a Disaster Recovery CMDB 105, a portal 106, workflow and project management tools 110, a Recovery Execution System (RES) 111 including a Recovery Markup Language (RML) generator 209, recovery workflow orchestration 210, recovery automation component subsystems 122, and a hot site 120. In addition, an event scheduling subsystem 107 accessable as a Worldwide Web Scheduling Service (WWSS) may include a scheduler 108 and a hot site inventory database 109.

A typical process to automate disaster recovery proceeds as follows. In a first step 201 administrative personnel or configuration engineers install application probes in the customer production data center 101. The probes are used by the discovery tool 103 to discover installed applications and the dependencies those applications have on particular Configurable Items (CI's) in the data center 101. The discovery tool 103 may be Hewlett-Packard (HP) Discovery and Dependency Mapping Advanced (DDMA), BMC Atrium Discovery Dependency Mapping (ADDM) or other tools that can automatically discover physical and virtual IT assets, applications, and the dependencies between them.

Configuration data for these Configurable Items (CI's) may be discovered by these probes (or in other ways) and stored in the Production CMDB 104. The Production CMDB may, for example, be an HP Universal CMDB (uCMDB).

In a next step 203, the discovered configuration information is also copied over a secure unidirectional connection (such as an HTTPX connection), and cloned to a Disaster Recovery (DR) CMDB 105.

The cloned DR CMDB 105 may then be used to create, maintain and specify a recovery configuration without impacting the dependency of the operating production environment on the Production CMDB 104. Subsequent exchanges between the two configuration databases 104 and 105 can keep the configuration information in DR CMDB 105 up to date.

In a next step 204, when a customer wishes to schedule a test or declare a disaster, they access the portal 106. Based on a presented customer identification (ID) credential, such as a login ID, a specific recovery configuration is retrieved from the DR configuration database 105. The customer can then enter additional details, such as the scope of the test or disaster recovery. The scope may specify, for example, one or more applications to be recovered and a time at which to perform the recovery.

In a next step 205, using the provided scope and a requested time (which may be a future date in the case of the test or immediate execution in the case of disaster recovery) a scheduling service 107 is contacted. The scheduling service 107 uses the recovery configuration to assess availability of matching resources in the hot site inventory 109.

In a next step 206, based on resource availability, the scheduling service reserves the needed resources for use at the scheduled time and provides a confirmation report to the customer via portal 106.

In step 207, the recovery event occurs at the scheduled time and the Recovery Execution System 111 is launched in step 208.

Next in step 209, the RES 111 extracts the recovery configuration information from the CMDB 105 for the specific scope. The RML generator 209 then automatically creates an XML document using a proprietary schema referred to in herein as the Recovery Markup Language (RML) file. The RML file contains a specification for a master workflow that contains a set of logical steps to recover the in-scope application(s). The RML generator 209 is discussed in greater detail below.

In a next step 211, the recovery workflow orchestration engine 210 then translates the logical workflow as specified in the RML file into a set of physical set of workflow-enabled tasks. These workflows may specify using particular automation subsystems as "subflows" that automate tasks to be performed on the servers, network devices, storage devices and other configurable items on the hot site 120.

In step 211, the RES 111 then communicates with event scheduling system 107 to acquire access to the assets that were reserved for the event.

In state 212, the RES 111 then invokes the various automation subsystems 122 to perform the workflow tasks on the reserved components. As seen, typical automation subsystems 122 may include SunGard Recovery Automation, HP Server Automation, HP Network Automation, HP Storage Automation, and other OEM automation components depending upon the configurable items with the scope of the recovery event.

Figure 2:
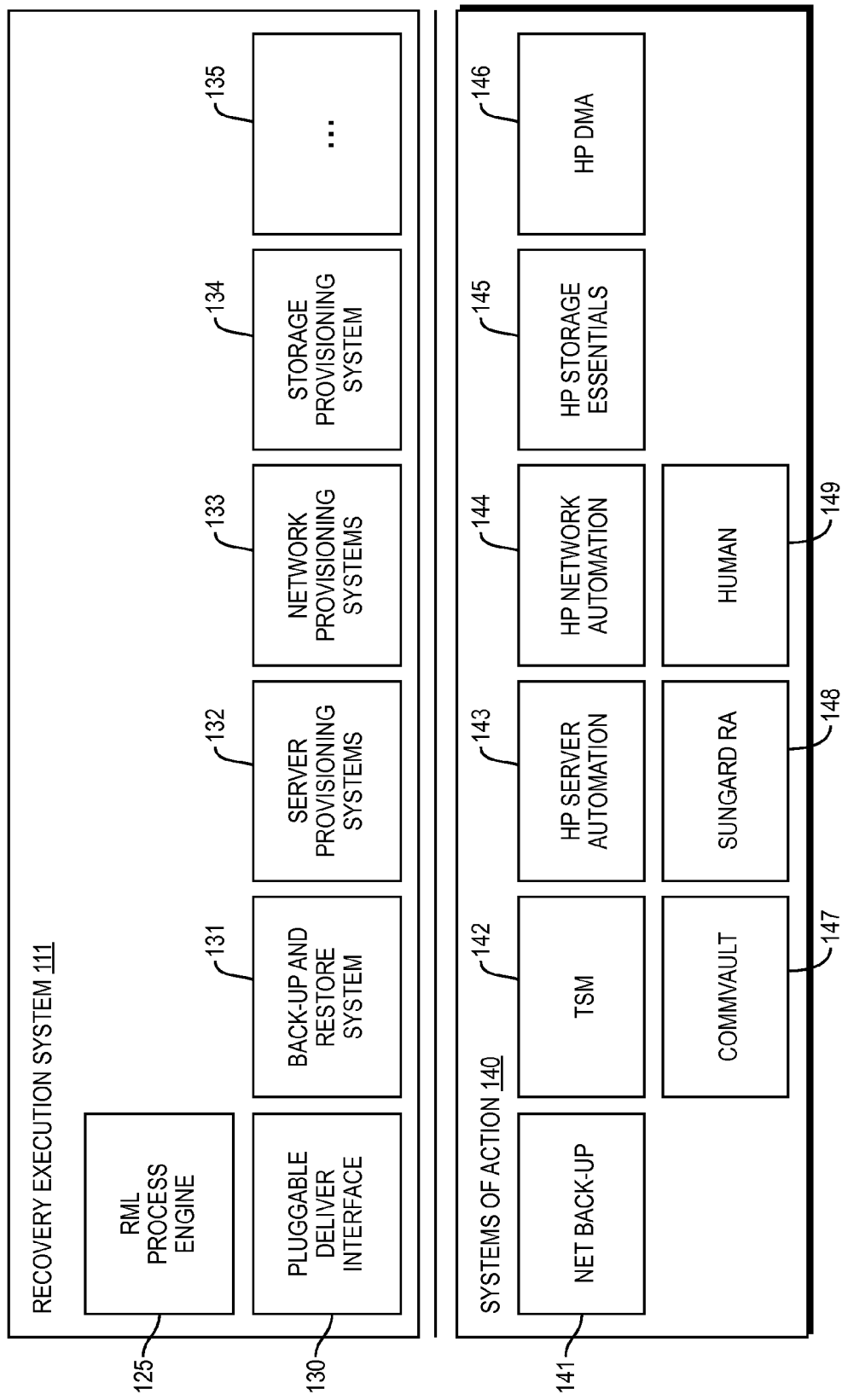
FIG. 2 is a high-level view of the RES and automation components.

FIG. 2 is a more detailed view of components of the RES 111. An RML process engine 125 reads the RML file and engages various subsystems to implement actions. A pluggable driver interface is provided to the various subsystem functions including backup and restore subsystem 131, server provisioning systems 132, network provisioning systems 133, and storage provisioning systems 134. In general, other types of subsystems 135 useful in provisioning or arranging configurable items may also be accessible to the RML process engine 125.

The RML process engine 125 may for example be implemented as a Java program that can read the RML file and the contents of the DR CMDB 105 and then invoke corresponding systems of action 140 as indicated by workflows in the RML file. Input is also provided to the RML process engine 125 from the scheduler 107 to indicate which assets are currently at its disposal to instantiate a particular work flow at hot site 120.

The RML process engine 125 may also invoke recovery automation functions to implement actions. In one example environment, these automation functions may include a Net backup 141, Tivoli storage manager (TSM) 142, HP Server Automation 143, HP Network Automation 144, HP Storage Essentials 145, HP Database Middleware Automation (DMA) 146, Commvault 147, Specialized Recovery Automation (RA) services such as SunGard RA 145 and/or manual tasks to be performed by humans 149.

Figure 3:
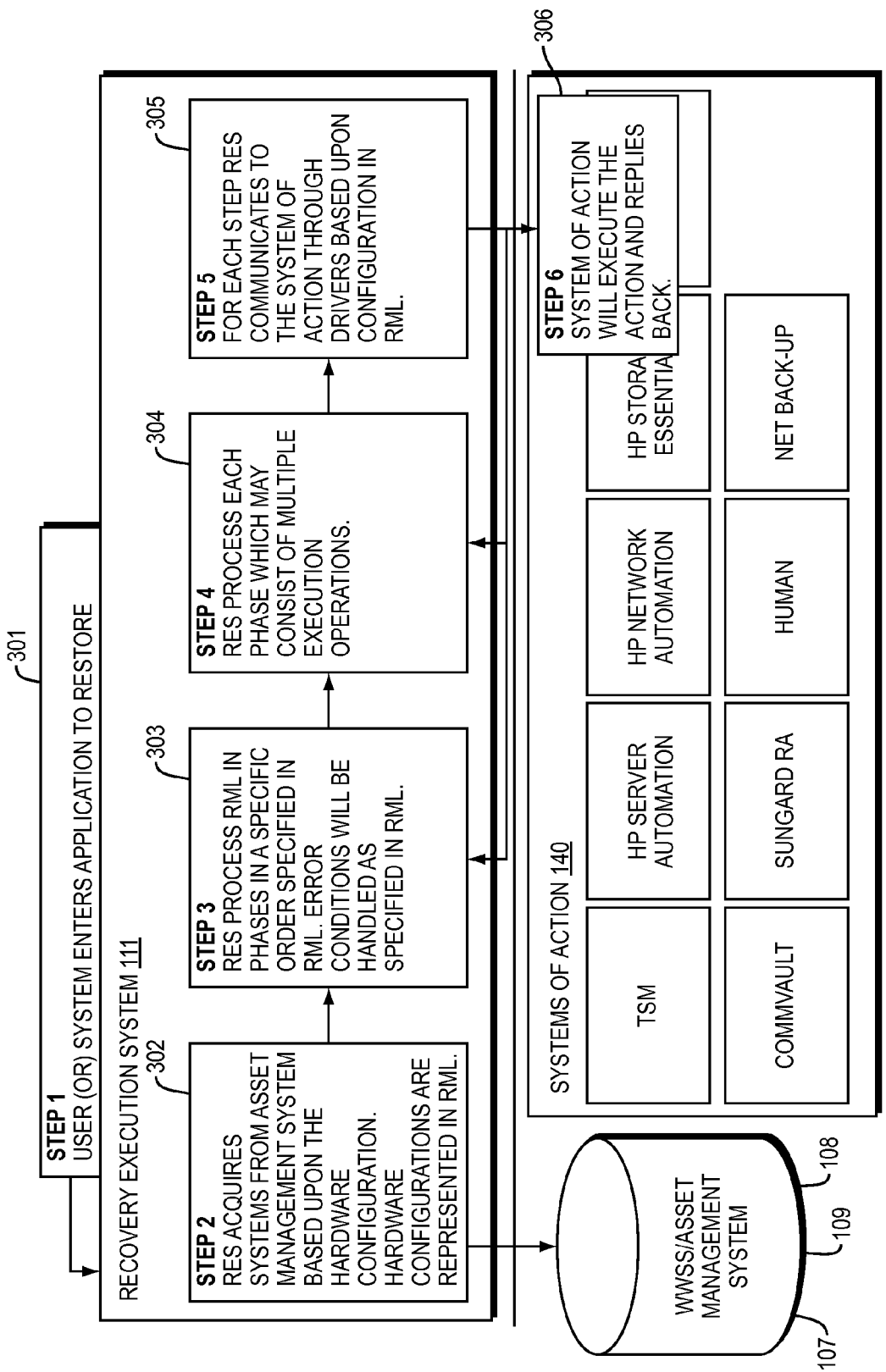
FIG. 3 is a more detailed view showing example steps performed by the RES using an operaton orchestration tool.

FIG. 3 depicts an example sequence of steps performed by the RES 111 to implement recovery of data center 101 at hot site 120.

In a first step 301, a user indicates application(s) to be restored via portal 106. In a next step 302, the RES 111 acquires asset information the DR CMDB 105, scheduler 107 and inventory database 109 concerning the needed target hardware configuration.

In a next step 303, the RES 111 processes the RML file in an order as specified in the RML file itself. Any error conditions may be handled the specified in the RML file.

More particularly, in a next step 304, the RES 111 can then process the master workflow in many different phases, as was determined from the application dependencies.

Finally, in step 305 for each phase in the RML file, the RES communicates with the corresponding system of action to execute one or more subflows. For example, a given system of action 140 (or subflow) can execute action(s). When the subflow is complete, it can reply back to the RES 111 to execute the next phase in the master workflow.

Figure 4:
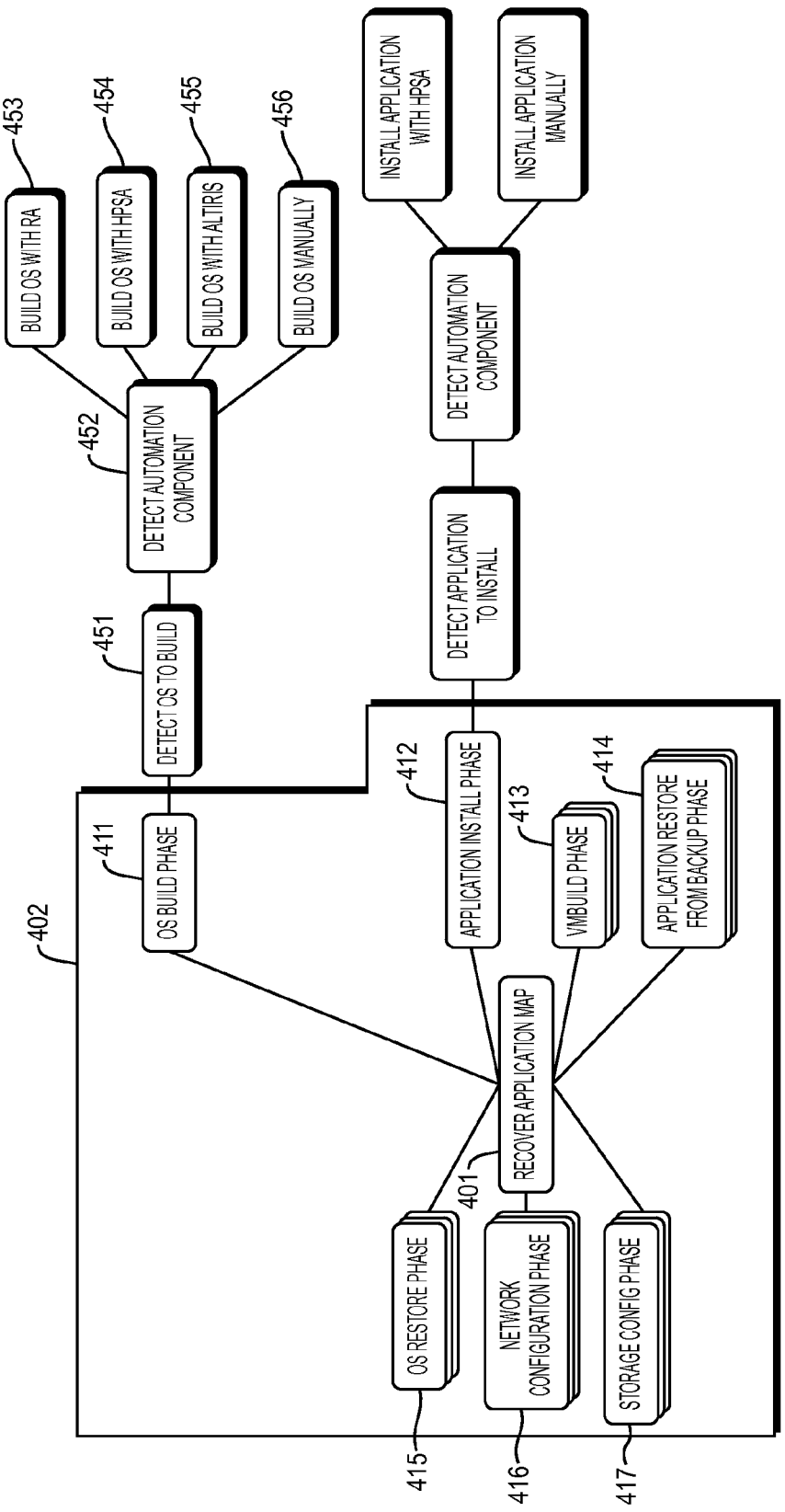
FIG. 4 is an example simple master workflow processed by the RES and actionable workflow.

Turning attention now to FIG. 4, a simple example of a master workflow and actionable subflows will be described in more detail. A Recover Applications Map 401 is retrieved together with the elements of a RML file that indicate a master workflow 402. In this example shown here, the master workflow 402 includes two phases—an Operating System (OS) build phase 411 and an application install phase 412.

The Application Map 401, described in more detail below, includes data representing all configurable items that are connected to the application(s) within the recovery scope. This may include a list of servers, storage devices and network devices, and their associated configuration information.

OS build phase 411 invokes a sequence of steps including "detecting which operating system to build 451" and "detecting available automation components 452."

Step 451 can detect which operating system needs to be built, for example, by reading the CMDB 105 and/or Application Map information. Automation component detection 452 then uses the OS information to determine the available automation components that can be used to build that operating system. The RES 111 thus specifies that an operating system needs to be built, but when it comes to the "hows" of actually building the OS, the available automation components are leveraged. In the present example, available subtasks for building an operating system include Recovery Automation (RA) 453, HP Server Automation (SA) 454, Altris 455, and a manual build 456.

In one example, assume that the CMDB indicates that the OS to build is an implementation of Red Hat Linux. Assume also that this is the first time that the RES 111 has been asked to build this particular instance of Red Hat Linux. Here the automated OS build options 453, 454, 455 are not available, and the OS must be built manually 456. However at some later time an administrative user may determine how to build the particular Red Hat Linux instantiation using HP SA. An automated HP SA Red Hat install subflow can then be linked to the detect automation component 452 via input at portal 106. On subsequent iterations, without altering the high-level master workflow 402, this new automation component 454 for building Red Hat Linux is then available to be automatically invoked by the corresponding detect automation component.

Thus when a new automation component becomes available, another subflow can be added to the available options in the detect automation component 452, and related aspect(s) of the master workflow need not be modified.

It is also possible that the subflows are specific to each type of automation component and also to each service provider or customer. For example, building Red Hat Linux for one customer's data center may involve a different automation component than for another customer.

Note that the master flow 402 can remain the same regardless of how the OS build phase 411 and application install phase 412 are actually implemented. Thus, in a more general sense, a recovery workflow tends to provision infrastructure, configure infrastructure, restore data to the configured infrastructure, and then start the application(s). Also, in a general sense, the subflows called by the master flow indicate how to carry out particular tasks running on individual task automation systems.

It is also now understood that one essential aspect herein is eliminating hand coding of Operations Orchestration (OO) by detecting what to do (build an OS, or install an application) and automation components 452 which in turn enable programmatic execution of available automation tasks.

Figure 5:
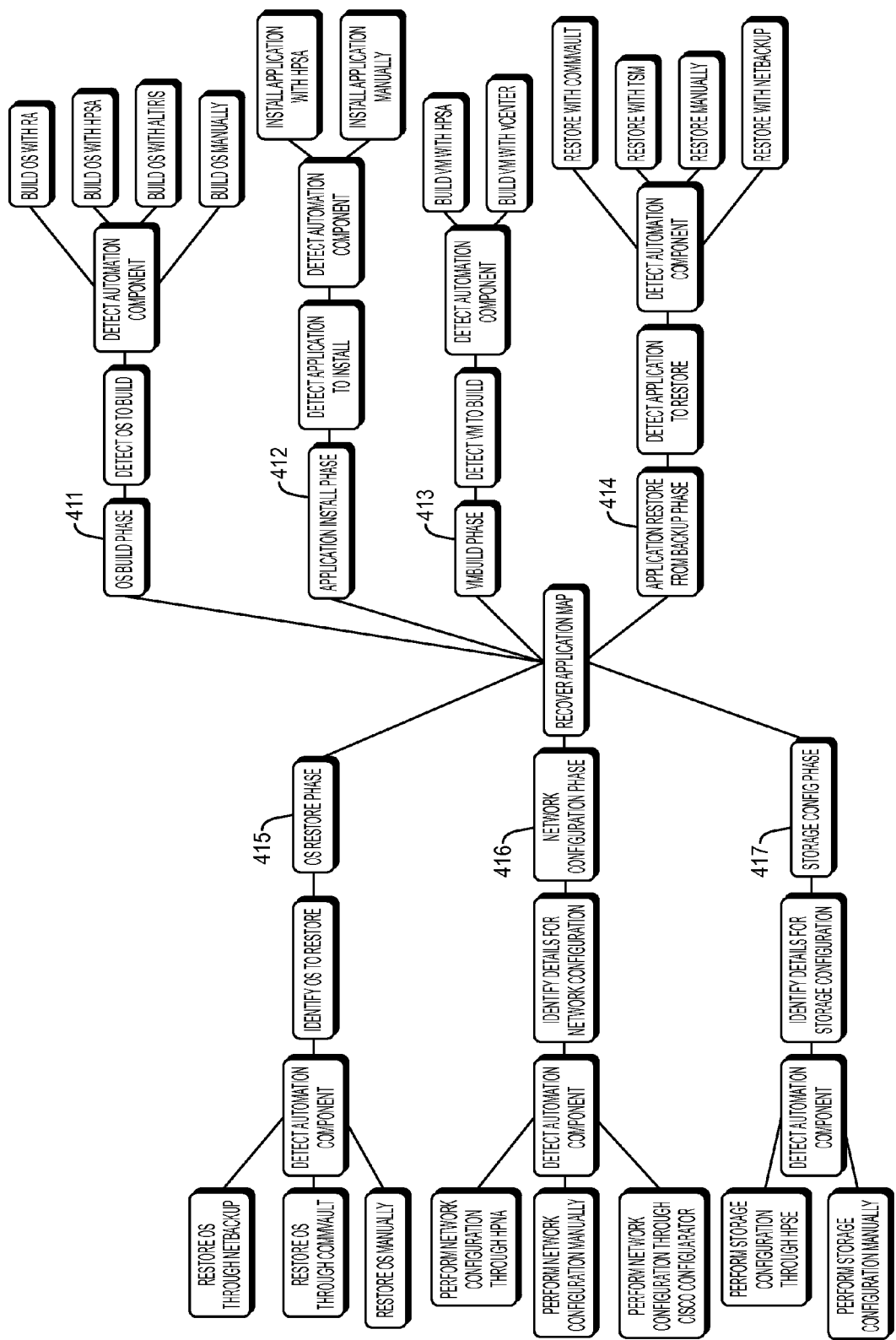
FIG. 5 is a more complex master workflow.

FIG. 5 is a more complicated example of a master workflow for restoring an entire data center. In this example, the master workflow 402 includes an OS build phase 411 and application install phase 412 but also includes a number of other phases such as a virtual machine build phase 413, application restore from backup phase 414, operating system restore phase 415, network configuration phase 416 and storage configuration phase 417. Each phase type in the master flow has a detection piece and an automation component piece, and the automation components links to the available subflows to carry out automated tasks. In one example, for "application data restore from backup 414," the detect automation components 414-1 may provide links to automation components including Commvault 414-2, TSM 414-3, NetBackup 414-4 or manual restore 414-5. A network configuration phase 416 may have links to subflows that include performing network configuration through HPNA and Cisco configurator or manual configuration. Similar sets of subflows for storage configuration 417 OS restore 415, and VM build 413 options are also illustrated.

Figure 6:
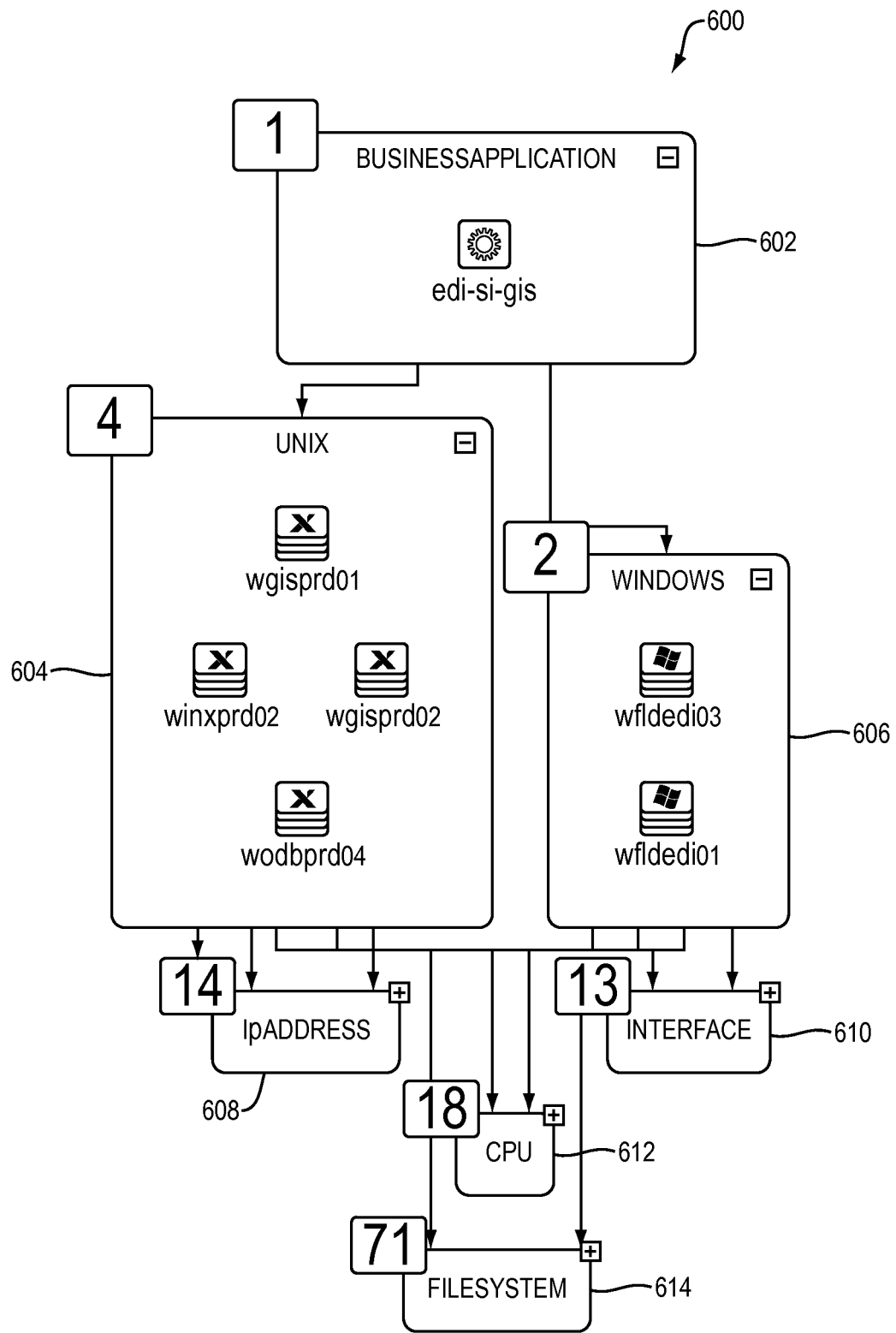
FIG. 6 is an example Application Map.

FIG. 6 is a rendition of an example application map 600 that maintains the relationship for one single application to a number of in-scope Configurable Items (CI's) as previously mentioned. In the particular instance shown, the application 602 is an Electronic Data Interchange (EDI) application named "edi-si-gis". Six servers are within the recovery scope here, including four UNIX servers 604 (the hosts named wgisprd01, wgisprd02, winxprd02, and wodbprd04) and two Windows servers 606 (the hosts named wfldedi 03 and wfdedi01). The digit displayed next to each item type in the hierarchy indicates how many configurable items (CI's) are associated with that particular configurable item type. Graphical User Interface options convenient for displaying the application map 600 (such as + and − click boxes to expand or collapse the application map hierarchy), may be provided.

Also show as part of the application map 600 are additional resources used by the application 602 including Internet Protocol addresses 608 (of which there are fourteen (14) in use, interfaces 610 (of which there are thirteen (13) in use, and which may for example be interfaces to other systems and databases), CPU cores 612 (of which there are eighteen (18) in use) and filesystems 614. In FIG. 6, the view of these resources is collapsed and thus the details are not visible; the details can be accessed via the expand click box (+) displayed next to each configurable item type.

Each of the items in the example application map 600 hierarchy of FIG. 6 are connected to the single EDI application 602. It should be understood that, more generally, a particular recovery scope may include multiple applications, each having their own application map 600.

FIGS. 7A, 7B, and 7C are excerpts from an example RML file 700 generated for the EDI application shown in FIG. 6. It is but one possible example of a generated XML-based schema with specialized tags and attributes to specify a high-level master flow with subflows as previously described above.

A first excerpt of the RML file 700 shown in FIG. 7A contains server definition info that pertains to one of the Linux hosts (wgisprd02). This is identified by a first tag 701 and the following tags that specify that host's platform type, operating system type, and needed random access memory (RAM). Several classes of subflows are associated with each configurable item, including Provision 702, Configuration 704, Restoration 706, and Cleanup 708. The end of the server info definition for Linux host (wgisprd02) is indicated by another tag 701. It should be understood that FIG. 7A is meant to be a non-limiting example and that there may be action types in each class of automation actions other than those illustrated.

Within each class are included one or more callable automation components (each identified by an <Action ID> tag) and one or more parameters (identified by <param name> tags). Within the <Provision> class for this host, a first Action ID 718 is an automation component for deploying a server, with parameters including EVENT_ID, SERVER_ASSET, RAID_LEVEL, HOSTNAME, BACKUP AGENT, OS_NAME, OS_SP, and OS_ARCH. A second Action ID 720 enables an automation component that uses HP SA for installing a Linux distribution at a particular MAC address.

Within the Configuration class of subflow, a third Action ID 722 is for enabling an automation component that disables a Linux firewall. Yet another available action is Action ID 724 that is a manual component that waits for user input until migration to a customer network to complete.

The example Restoration class may include an Action ID 730 that invokes an HP SA script to perform a Netbackup action and Action ID 732 that runs another HP SA script to restore Linux.

An example Cleanup class is not shown in detail but would include other Action IDs that might be necessary for orderly conclusion of subflows.

It should be understood that the RML associated with each configurable item type may have different Action ID types. FIG. 7B is an example RML excerpt 738 for Provisioning, Configuration, and Restoration of AIX for the host named "wodbprd04" in the application map of FIG. 6. As such, the automation components associated with each action type will be tailored for an AIX installation and thus differ from those shown for the Linux installation in FIG. 7A.

FIG. 7C is an RML excerpt 740 for the host names "wfldedi01" that is running Windows 2003. The associated Action IDs are thus appropriate for this environment, including HP SA automation components which install Windows 740, disable a Windows firewall 742, and configure and partition a Windows disk 744.

What is claimed is:

1. An automated recovery procedure for recovering a data center to a recovery site, comprising:
at a Recovery Execution System (RES) server,
receiving configuration data for infrastructure elements located in the data center from a Configuration Management DataBase (CMDB);
receiving information representing a recovery scope for the automated recovery procedure;
discovering configurable items within the data center that are within the recovery scope;
receiving information, from a scheduling server, representing resources available at the recovery site at a recovery time;
programmatically generating a master workflow with multiple phases, the master workflow generated from the configuration data for the configurable items that are within the recovery scope, and the master workflow also generated depending upon the resources available at the recovery site at the recovery time, and where phases of the master workflow specify for a configurable item:
a task; and
an automation component process; and
at another executing server the master workflow including at least one automation component process and including at least one subflow for executing at least one task, to thereby configure at least one resource available at the recovery site.

2. The method of claim 1 wherein the recovery scope is specified as an application, and the step of discovering configurable items further comprises:
accessing an application map that to determine which configurable items depend on the application.

3. The method of claim 1 further comprising:
maintaining the configuration data for the infrastructure elements in a Data Center Configuration Management DataBase (CMDB) associated with the data center;
periodically cloning the Data Center CMDB to a Disaster Recovery (DR) CMBD; and
wherein configuration data for the infrastructure elements within the recovery scope is received from the Disaster Recovery CMDB.

4. The method of claim 1 wherein
discovering configurable items within the recovery scope further includes installing one or more probes to the infrastructure elements in the data center.

5. The method of claim 1 wherein the automation component process is one of a process associated with a:
storage automation component,
server automation component,
network automation component,
backup automation component, or
recovery automation component.

6. The method of claim 1 wherein the master workflow includes at least an operating system build phase and an application install phase.

7. The method of claim 6 wherein the master workflow further includes one or more of:
a virtual machine build phase,
an application restore from backup phase,
a storage configuration phase,
a network configuration phase, or
an operating system restore phase.

8. The method of claim 1 further comprising:
storing a representation of the master workflow as a sequence of operations specified in a mark up language data file.

9. The method of claim 8 further comprising:
executing the master workflow by submitting the markup language file to an operations orchestration engine.

10. A method for performing a disaster recovery (DR) procedure for a production data processing environment at a recovery site, the data processing environment including one or more physical data processing infrastructure elements, the method comprising:
at a Recovery Execution System (RES) server, receiving configuration information for the infrastructure elements from a Configuration Management DataBase (CMDB);
receiving information concerning a recovery scope for the DR procedure:
from the configuration information and the recovery scope, determining a subset of resources that are configurable items at the recovery site needed to recover the infrastructure elements within the scope of the DR procedure;
submitting a request to a scheduling server to schedule availability of the subset of resources at the recovery site at a scheduled time;
at the scheduled time,
extracting configuration information from the CMDB for the configurable items within the recovery scope;
programmatically generating a master workflow with multiple phases, the master workflow generated from the configuration information extracted from the CMDB for the configurable items that are within the recovery scope, and where phases of the master workflow specify, for each configurable item within the recovery scope:
a sequence of tasks;
a configuration detection process;
an automation component process, wherein the automation component process executes at least one automation component including at least one subflow for executing the sequence of tasks to configure at least one of the resources: and
at an Operations Orchestration server,
executing the master workflow to perform the DR procedure and thereby configure the recovery site.

11. The method of claim 10 wherein the recovery scope for the DR procedure is specified as an application to be subjected to the DR procedure, and the CMDB further maintains an application map that indicates which infrastructure elements are associated with the application.

12. The method of claim 10 further comprising:
maintaining the configuration information for the infrastructure elements in a Data Center Configuration Management DataBase (CMDB) associated with the data processing environment;
periodically cloning the Data Center CMDB to a Disaster Recovery (DR) CMBD; and
wherein the configuration data for the configurable items within the recovery scope is received from the Disaster Recovery CMDB.

13. The method of claim 10 wherein the RES server performs a further step of:
discovering configurable items within the scope of the DR test by installing one or more probes to the infrastructure elements in the data processing environment.

14. The method of claim 10 wherein the automation component is one of a:
storage automation component,
server automation component,
network automation component,
backup automation component, or
recovery automation component.

15. The method of claim 10 wherein the master workflow includes at least an operating system build phase and an application install phase.

16. The method of claim 15 wherein the master workflow further includes one or more of:
a virtual machine build phase,
an application restore from backup phase,
a storage configuration phase,
a network configuration phase, or
an operating system restore phase.

17. The method of claim 10 wherein the RES server further performs a step of:
storing a representation of the master workflow as a sequence of operations specified in a mark up language data file.

18. The method of claim 10 wherein the DR procedure is either a disaster recovery test, or a recovery from a disaster.

19. The method of claim 10 wherein the available resources at the recovery time are different from the configurable items in the data center.

20. A Disaster Recovery (DR) system for recovery of a data processing environment to a recovery site, the data processing environment including one or more physical data processing infrastructure elements, the system comprising:
a Configuration Management DataBase (CMDB), for maintaining configuration information for the infrastructure elements;
a scheduling server, for scheduling resources available at the recovery site;
an operations orchestration server, for executing a workflow within the recovery site; and
a Recovery Execution System (RES) server, the RES server executing program code for:
receiving configuration information for the infrastructure elements from the CMDB;
receiving information concerning a recovery scope and a scheduled time for the DR procedure;
from the configuration information and the recovery scope, determining a subset of resources that are configurable items at the recovery site needed to recover the infrastructure elements within the scope of the DR procedure;
submitting a request to the scheduling server to schedule availability of the subset of resources at the recovery site at the scheduled time;
extracting configuration information from the CMDB for the configurable items within the recovery scope at the scheduled time;
programmatically generating a master workflow with multiple phases, the master workflow generated from the configuration information for the configurable items within the recovery scope, and where phases of the master workflow specify, for each configurable item within the recovery scope:
a task;
a configuration detection process;
an automation component process, wherein the automation component process executes at least one automation component including at least one subflow for executing the task; and
forwarding the master workflow to the operations orchestration server, to perform the DR procedure and configure the recovery site.

21. The system of claim 20 wherein the recovery scope is specified as an application to be subjected to the DR procedure, and configuration information in the CMDB additionally comprises an application map that relates which of the infrastructure elements are associated with the application.

22. The system of claim 20 wherein a Data Center Configuration Management DataBase (CMDB) associated with the data processing environment maintains the configuration information for the infrastructure elements, and further comprising:

a Disaster Recovery (DR) CMBD that periodically clones the Data Center CMDB.

23. The system of claim 20 wherein the RES server further executes program code for:
discovering configurable items within the scope of the DR test by installing one or more probes to the infrastructure elements in the data processing environment.

24. The system of claim 20 wherein the automation component is one of a:
storage automation component,
server automation component,
network automation component,
backup automation component, or
recovery automation component.

25. The system of claim 20 wherein the master workflow includes at least an operating system build phase and an application install phase.

26. The system of claim 25 wherein the master workflow further includes one or more of:
a virtual machine build phase,
an application restore from backup phase,
a storage configuration phase,
a network configuration phase, or
an operating system restore phase.

27. The system of claim 20 wherein the RES server further executes program code for:
storing a representation of the master workflow as a sequence of operations specified in a mark up language data file.

* * * * *